United States Patent
Columbus et al.

(10) Patent No.: US 6,268,413 B1
(45) Date of Patent: Jul. 31, 2001

(54) HIGH-STRENGTH ADHESIVE PASTE AND DISPENSER

(75) Inventors: Peter S. Columbus, Melville, NY (US); Yogeshbhai B. Patel, Gahanna, OH (US)

(73) Assignee: Elmer's Products, Inc., Columbus, OH (US)

( * ) Notice: Subject to any disclaimer, the term of this patent is extended or adjusted under 35 U.S.C. 154(b) by 0 days.

(21) Appl. No.: 09/305,522

(22) Filed: May 5, 1999

(51) Int. Cl.$^7$ ................. C08J 5/10; C08L 3/00; C08L 89/00

(52) U.S. Cl. ............... 524/47; 524/48; 524/524; 524/315; 239/11

(58) Field of Search ................. 524/47, 48, 37, 524/43, 44, 45, 292, 354, 524, 563, 315; 239/11

(56) References Cited

U.S. PATENT DOCUMENTS

| | | | |
|---|---|---|---|
| 5,292,068 | * | 3/1994 | Raterman et al. ............... 239/11 |
| 5,470,617 | * | 11/1995 | Nishii et al. .................. 427/521 |
| 5,641,349 | * | 6/1997 | Koubek et al. ................. 106/206.1 |
| 5,676,742 | * | 10/1997 | Arendt et al. ................. 106/15.05 |
| 5,688,845 | * | 11/1997 | Eden et al. .................... 524/48 |

OTHER PUBLICATIONS

H.B. Fuller Company, "Technical Data Sheet", Fulatex® Polymer Products—Product Type: Vinyl Acetate Homopolymer, Jul. 9, 1998, 2 pages.
Ashland Chemical, Inc., "Material Safety Data Sheet", Polypropylene Glycol 1200, May 25, 1994, 3 pages.
AVEBE Venndam–Holland, "Avedex W 15—White, high–viscosity grade, potato starch dextrin", Product Information, 2 pages.
American Maize–Products Company, "Amaizo 100 Starch", Product Data, 1 page.
Aqualon Company, "Natrosol® 250 Hydroxyethylcellulose—A Nonionic Water–Soluble Cellulose Ether", Aug. 1989, 2 pages.
Van Dyk, "Ethyl Paraben, NF", Product Data, 1 page.
Hoechst Celanese Corporation, "Glyoxal 40", Product Data, 1 page.
Ashland Chemical, "Amerstat® 251 Microbiocide Information", Nov. 4, 1994, 6 pages.
Velsicol Chemical Corporation, "Benzoflex® Plasticizer Product Line", Product Summaries, pp. 1–7.
Aqualon Chemical, "Aqualon® Cellulose Gum", Material Safety Data Sheet, pp. 1–7.
Hercules Incorporated, "Cellulose Gum—Sodium Carboxymethylcellulose, Chemical and Physical Properties", pp. 1–7.
Aqualon Chemical, "Aqulaon™ Cellulose Gum—Sodium Carboxymethylcellulose, Physical and Chemical Properties", pp. 1–8.
Dow Chemical, "Methocel Cellulose Ethers, Unique, water soluable polymers with a broad variety of commercial applications", pp. 1–8.
Van Waters & Rogers, Inc., "Methocel® E4M Premium Hydroxypropyl Methylcellulose", Material Safety Data Sheet, pp. 1–6.

* cited by examiner

*Primary Examiner*—Samuel A. Acquah
*Assistant Examiner*—U. K. Rajguru
(74) *Attorney, Agent, or Firm*—Standley & Gilcrest LLP

(57) ABSTRACT

The present invention includes a high strength adhesive and includes a dispenser containing a high strength adhesive. The invention is an adhesive composition comprising: (a) water present in an amount of from about 40 percent to about 70 percent by weight; (b) polyvinyl acetate present in an amount of about 15 percent to about 35 percent by weight; (c) dextrin present in an amount from about 5 percent to about 35 percent by weight; and (d) starch present in an amount from about 0 percent to about 5 percent by weight; the adhesive having at least 30% by weight solids, having a paste-like consistency, and having a bond strength greater than about 2000 p.s.i. as measured by ASTM D-905. The adhesive of the present invention has a very workable consistency that is very much like room-temperature butter or shortening used in cooking.

35 Claims, No Drawings

HIGH-STRENGTH ADHESIVE PASTE AND DISPENSER

TECHNICAL FIELD

The present invention is in the field of high-strength adhesives.

BACKGROUND

In the field of high-strength adhesives, it is desirable to produce an adhesive with a variety of beneficial characteristics.

For industrial, do-it-yourself and craft applications, it is desirable to produce a high-strength adhesive which is easily applied (typically for relatively high-volume applications). It is desirable to produce an adhesive that is spreadable and stays in place once applied. In addition, it is beneficial to produce adhesive that has good wet tack properties (i.e., having good resistance to separation of the adhered members along a vector normal to the adhered surfaces). Furthermore, it is desirable to produce an adhesive that is workable (i.e., having a practical repositioning time on the order of a few minutes) while being able to set relatively quickly to arrive at a strength sufficient to hold the substrtates or parts together to prevent separation strength (i.e., on the order of several minutes).

It is also desirable to have high-strength adhesives in a physical form that may be dispensed from open tubs or buckets through use of an application tool such as a trowel or brush, or that may be dispensed from tube- or plunger-type containers, such as syringe-type or caulk gun dispensers.

It is also beneficial to be able to produce high-strength adhesives from mixtures having a fluid consistency to allow for the use of standard mixing and dispensing equipment typically used for low viscosity products, but which set or "paste back" to a paste-like consistency allowing for ease of application. It is also desirable to have the product "paste back" within a workable time frame, allowing it to be dispensed to containers prior to arriving at its final physical form.

Another beneficial characteristic of high-strength adhesives is to be able to achieve relatively high final bond strengths with or without a static force being brought to bear (such as through clamping) to urge together the substrates to be joined.

It is also desirable to produce such high-strength adhesives in a physical form so that they reduce or prevent spillage from tipped open containers (such as tubs), or from tube- or plunger-type containers that are laid open on their sides. In the case of plunger-type containers, such as syringe-type or caulk gun dispensers, it is also desirable to be able to use high-strength adhesives that are of a sufficiently colloidal consistency that unused portions may be withdrawn into the dispenser once extruded, to avoid waste through over-application and spillage.

Another desirable characteristic in a high strength adhesive is the ability to be used on a wide variety of porous substrates including cloth and similar materials, without bleed-through of wetness.

From the following disclosure or through practice of the invention, other advantages may become apparent.

SUMMARY OF THE INVENTION

The present invention includes a high strength adhesive and includes a dispenser containing a high strength adhesive.

In broadest terms, the present invention is an adhesive composition comprising:

(a) water present in an amount of from about 40 percent to about 70 percent by weight;
(b) polyvinyl acetate present in an amount of about 15 percent to about 35 percent by weight; (c) dextrin present in an amount from about 5 percent to about 35 percent by weight; and (d) starch present in an amount from about 0 percent to about 5 percent by weight; the adhesive having at least 30% by weight solids, having a paste-like consistency, and having a bond strength greater than about 2000 p.s.i. as measured by ASTM D-905.

When pasted back, the adhesive has a very workable consistency that is very difficult to measure, but is very much like room-temperature butter or shortening used in cooking.

When freshly made (prior to pasting back), the adhesive of the present invention has an initial viscosity greater than 750 centripoise, and typically approaching about 3,000 centripoise, as measured by a Brookfield Model LV #4 spindle at 60 RPM at 35° C. (designated herein as "LV/4/60RPM").

The polyvinyl acetate may be in the form of a dispersion in water (preferably 55% solids in water), referred to herein as P-571 (stabilized with polyvinyl alcohol). As alternatives, a vinyl acetate homopolymer, stabilized with hydroxyethylcellulose and sold under the name Fulatex® by H. B. Fuller Company of St. Paul, Minn., may also be used, as well as a dextrin-stabilized polyvinyl acetate sold under the name Rhoplex 6215 from the Rohm & Haas Company of Philadelphia, Pa. It is most preferred that the polyvinyl alcohol content, where used, should be maintained at a level no more than that needed to protect the polyvinyl acetate dispersion (typically no more than that contained in the commercially supplied product).

The dextrin used in the present invention may be from any appropriate dextrin source. Preferably the dextrin is high-viscosity potato dextrin. An example is Avedex W 15, commercially available from AVEBE of Foxhol, Holland.

The starch used in the present invention may be from any appropriate starch source. Preferably the starch is a raw, unmodified starch, preferably raw cornstarch. An example is Amaizo 100 starch, commercially available from American Maize-Products Company of Hammond, Ind.

The adhesive composition of the present invention may optionally include at least one water-soluble polymer, such as those selected from the group consisting of cellulose polymers and cellulose gums, including hydroxymethylcellulose, hydroxyethylcellulose and carboxymethylcellulose, hydroxyethylcellulose being preferred; and natural gums (e.g., xanthan gum). Examples of these materials are those sold under the names NATROSOL®, preferably NATROSOL® 250 HHXR (hydroxyethylcellulose; commercially available from Aqualon Company), METHOCEL® (hydroxymethylcellulose) and ETHOCEL® E4M (hydroxypropyl methylcellulose; commercially available from Dow Chemical Company), cellulose gum (sodium carboxymethylcellulose; commercially available from Aqualon Company, and under the name Hercules® commercially available from Hercules Incorporated).

The adhesive composition of the present invention may optionally include at least one water-soluble plasticizer for the starch derivatives and/or the water-soluble-polymer(s), such as glycerin, sorbitol, corn syrup, other sugars, and propylene glycol. The adhesive composition of the present invention also may optionally include at least one water-insoluble plasticizer for the polyvinyl acetate, such as Benzoflex® 9-88 (dipropylene glycol dibenzoate; commercially available from Velsicol Chemical Corporation of Rosemont, Ill.), Santicizer 160 (butyl benzyl phthalate; commercially available from Monsanto of St. Louis, Mo.).

The adhesive composition may also include agent(s) to impart water resistance, such as glyoxal. An example is Glyoxal 40, commercially available from Hoechst/Celanese Corporation.

Other optional components include preservatives that may be selected from any appropriate composition, such as para-hydroxyethylbenzoate (ethyl paraben; commercially available from Van Dyk Division of Mallinkrodt, Inc. of Belleville, N.J.; or microbiocides, such as Amerstat® 251, commercially available from Ashland Chemical Company of Boonton, N.J.; or Kathon LX 1.5%, commercially available from Rohm & Haas.

A defoaming composition, such polypropyleneglycol, may also be used in a preferred embodiment. An example of this component is Polypropylene Glycol 1200, commercially available from Ashland Chemical Company.

The adhesive composition may also contain dyes or other colorants that may be used to indicate adhesive type such as would glue or craft glue. These will typically be used in amounts on the order of thousandths of a percent so as to have no effect on the other desirable characteristics of the adhesive.

In a preferred embodiment, the adhesive composition of the present invention comprises: (a) water present in an amount of from about 50 percent to about 60 percent by weight; (b) polyvinyl acetate present in an amount of about 24 percent to about 29 percent by weight; (c) dextrin (preferably potato dextrin) present in an amount from about 10 percent to about 25 percent by weight; (d) raw cornstarch present in an amount from about 2 percent to about 4 percent by weight; and the adhesive having at least 45% by weight solids, having a paste-like consistency, and having a bond strength greater than about 2000 p.s.i. as measured by ASTM D-905-86 entitled Standard Test Method for Strength Properties of Adhesive Bond in Shear by Compression Loading.

In this preferred embodiment, it is preferred that the adhesive composition contains hydroxyethylcellulose present in an amount from about 0.05 percent to about 1.5 percent by weight.

In a most preferred adhesive composition, the adhesive composition comprises:

(a) water present in an amount of from about 50 percent to about 60 percent by weight;

(b) polyvinyl acetate present in an amount of about 24 percent to about 29 percent by weight; (c) dextrin present in an amount from about 12 percent to about 20 percent by weight; and (d) raw cornstarch present in an amount from about 2 percent to about 4 percent by weight; the adhesive having at least 45% by weight solids, having a paste-like consistency, and having a bond strength greater than about 2000 p.s.i. as measured by ASTM D-905.

It is preferred that this adhesive additionally contain hydroxyethylcellulose present in an amount from about 0.1 percent to about 0.5 percent by weight.

It is also preferred the adhesive composition of this embodiment additionally comprise polypropyleneglycol as a defoamer present in an amount from about 0.05 percent to about 0.5 percent by weight, and most preferably present in an amount from about 0.20 percent to about 2 percent by weight.

In this embodiment, it is preferred to include corn syrup as a plasticizer.

If water resistance in the dry film is desired, it is also preferred to include glyoxal present in an amount from about 0.05 percent to about 0.2 percent by weight;

The present invention also includes an adhesive dispenser containing an adhesive composition in accordance with the present invention in any of its embodiments.

The adhesive may be packaged into buckets, tubs, tubes, bottles or glue-stick containers, plunger-type tubes, such as those known in the art. The dispenser of the present invention contains an adhesive of the present invention, and includes (a) a hollow container having an open end adapted to hold a paste adhesive and (b) a plunger to urge the paste adhesive from the tube. In glue-stick-type containers, it is preferred that the adhesive dispenser have serrations or grooves at its open end to best dispense and apply the paste adhesive of the present invention. This may be made by using known plastic sleeve glue stick dispensers, and providing their open end with serrations or grooves that are molded or cut into the open end of the barrel of the dispenser.

DETAILED DESCRIPTION OF THE PREFERRED EMBODIMENTS

In accordance with the foregoing summary of the invention, the following presents the preferred embodiments of the adhesive compositions of the present invention for the identified applications. Also included are some comparative examples showing formulations with less than optimal performance characteristics.

The following formulation Examples may be constituted using standard chemical engineering procedures known and used in the art. The order of addition is not critical, and will depend upon the type, size and mixing efficiency of equipment used. In the following Examples, steam generated heat and propeller-type agitator blades were used in a charger holding about 18,000 pounds. Scale-up or scale-down may be done from these Examples. Typically, it is preferred that about half the total water is charged into a clean kettle, and the hydroxyethylcellulose is added slowly with agitation, until the mixture becomes viscous and clear. At this point, the other aliquot of half the total water may be added, with the polypropylene glycol, the dextrin, and the starch and optional preservative. Mixing is continued and brought to about 50° C. for about 15–20 minutes. Agitation is continued while the temperature is raised to about 85–90° C. and maintained there for an additional 15–20 minutes. At this point, the glyoxal may be added.

In formulations using optional corn syrup, the mixture may be cooled to about 75° C. and the corn syrup added with agitation.

The mixture is then cooled to about 60° C. at which point the polyvinyl acetate dispersion and the optional propylene glycol may be added. The mixture is then cooled to about 50° C. with continued mixing, when the preservative may be added. When a preservative is used, care should be taken to add the preservative at a temperature at or below about 50° C.

If a dye or colorant is desired, this component may be added, and mixing continued until color is uniform (typically 30–45 minutes).

The mixture may then be drawn off through a 70 mesh stainless steel filter into clean bins and transported to filling equipment. Standard filling equipment may be used because the adhesives of the present invention are sufficiently low in viscosity to be dispensed with known equipment before the paste forms. It is preferred that the adhesive be packed within 12 hours.

The packaged product preferably should be held undisturbed for an extended period, typically about 7 days, in order to allow the adhesive to develop into a paste consistency, preferably wherein the product is non-flowing.

The adhesive may be packaged into buckets, tubs, tubes, bottles or plunger-type tubes, such as those known in the art, and using dispensing equipment known and used in the art. The adhesive may be dispensed using spatulas or squeezed from flexible bottles or other containers. It may also be dispensed from caulk gun type dispensers for commercial use.

EXAMPLE 1

The following adhesive example produced an adhesive whose base was somewhat too viscous and unmanageable during heating. Upon slight cooling, it became rubbery, and the sample was finished using this base. Some base material did not disperse well and floated as lumps. The material did not become firm after setting overnight. The dried film on glass showed very good water resistance and compression shear on maple wood was 3372 p.s.i.

Wood Glue Stick

| Component | Percent by Weight |
| --- | --- |
| Water | 34.70 |
| Polyglycol P-1200 (polypropylene glycol) | 0.20 |
| Vinol 523 | 2.50 |
| Kelzan | 0.65 |
| Amaizo 100 (corn starch) | 6.00 |
| Glyoxal 40% | 0.30 |
| Ethyl Paraben | 0.05 |
| P-571 (polyvinyl acetate; ~55% solids) | 55.00 |
| Propylene Glycol | 0.50 |
| Kathon LX 1.5% | 0.10 |

Bond Strength = 3372 psi

EXAMPLE 2

The following adhesive example, made only to determine compatibility, did not show a white particles upon initial cooking, and the mixture was smooth and uniform.

Wood Glue Stick

| Component | Percent by Weight |
| --- | --- |
| Water | 36.65 |
| Polyglycol P-1200 (polypropylene glycol) | 0.20 |
| Avedex W-15 (potato starch dextrin) | 16.00 |
| Amaizo 100 (corn starch) | 2.50 |
| Glyoxal 40% | 0.30 |
| P-571 (polyvinyl acetate; ~55% solids) | 43.700 |
| Propylene Glycol | 0.50 |
| Kathon LX 1.5% | 0.10 |

EXAMPLE 3

The following adhesive example had an initial viscosity (LV/4/60RPM) of 950 cps. This product had a slight watery separation on the first day of set-up, but no separation after four days. The bond strength was 3158 p.s.i. The product was firm and stable.

Wood Stick Glue

| Component | Percent by Weight |
| --- | --- |
| Water | 35.00 |
| Polyglycol P-1200 (polypropylene glycol) | 0.20 |
| Avedex W-15 (potato starch dextrin) | 16.00 |
| Amaizo 100 (corn starch) | 2.75 |
| Natrosol 250 HHXR | 0.30 |
| Ethyl Paraben | 0.05 |
| Glyoxal 40% | 0.15 |
| P-571 (polyvinyl acetate; ~55% solids) | 44.45 |
| Propylene Glycol | 1.00 |
| Amerstat 251 (preservative) | 0.10 |

Bond Strength = 3158 psi

EXAMPLE 4

The following adhesive example is similar to Example 3 with the addition of 1.00% Benzoflex 9-88 while reducing the polyvinyl acetate by 1.75% without adjusting formula to 100%. This formula had an initial viscosity of 950 cps at 35° C., which formed a non-flowing paste after setting undisturbed for four days. This formula was found to be preferred as a general purpose glue.

General Purpose Glue

| Component | Percent by Weight |
| --- | --- |
| Water | 35.33 |
| Polyglycol P-1200 (polypropylene glycol) | 0.20 |
| Avedex W-15 (potato starch dextrin) | 16.10 |
| Amaizo 100 (corn starch) | 2.77 |
| Natrosol 250 HHXR | 0.30 |
| Ethyl Paraben | 0.05 |
| Glyoxal 40% | 0.15 |
| P-571 (polyvinyl acetate; ~55% solids) | 43.00 |
| Benzoflex 9-88 (water-insoluble plasticizer) | 1.00 |
| Propylene Glycol | 1.00 |
| Amerstat 251 (preservative) | 0.10 |

Bond Strength = 2283 psi

EXAMPLE 5

The following adhesive example is similar to Example 3 with the addition of 3.00% Benzoflex 9-88 while reducing the polyvinyl acetate by 5.25% without adjusting formula to 100%. This formula had an initial viscosity of 750 cps at 35° C., which formed a non-flowing paste after setting undisturbed for four days. This formula had a more flexible dry film and was found to be preferred as a craft glue.

Craft Glue

| Component | Percent by Weight |
| --- | --- |
| Water | 35.87 |
| Polyglycol P-1200 (polypropylene glycol) | 0.20 |
| Avedex W-15 (potato starch dextrin) | 16.38 |
| Amaizo 100 (corn starch) | 2.80 |
| Natrosol 250 HHXR | 0.30 |
| Ethyl Paraben | 0.05 |
| Glyoxal 40% | 0.15 |
| P-571 (polyvinyl acetate; ~55% solids) | 40.15 |

-continued

| Craft Glue | |
|---|---|
| Component | Percent by Weight |
| Benzoflex 9-88 (water-insoluble plasticizer) | 3.00 |
| Propylene Glycol | 1.00 |
| Amerstat 251 (preservative) | 0.10 |

Bond Strength = 2283 psi

EXAMPLE 6

The following adhesive example exhibited somewhat firmer final paste consistency than the adhesives of Examples 3–5.

| Wood Stick Glue | |
|---|---|
| Component | Percent by Weight |
| Water | 34.00 |
| Polyglycol P-1200 (polypropylene glycol) | 0.20 |
| Avedex W-15 (potato starch dextrin) | 18.00 |
| Amaizo 100 (corn starch) | 3.00 |
| Natrosol 250 HHXR | 0.30 |
| Ethyl Paraben | 0.05 |
| Glyoxal 40% | 0.15 |
| P-571 (polyvinyl acetate; ~55% solids) | 43.20 |
| Propylene Glycol | 1.00 |
| Amerstat 251 (preservative) | 0.10 |

Bond Strength = 2379 psi

EXAMPLE 7

The following adhesive example exhibited somewhat firmer final paste consistency than the adhesives of Examples 6, without large decrease in bond strength.

| Wood Stick Glue | |
|---|---|
| Component | Percent by Weight |
| Water | 34.00 |
| Polyglycol P-1200 (polypropylene glycol) | 0.20 |
| Avedex W-15 (potato starch dextrin) | 20.00 |
| Amaizo 100 (corn starch) | 3.25 |
| Natrosol 250 HHXR | 0.30 |
| Ethyl Paraben | 0.05 |
| Glyoxal 40% | 0.15 |
| P-571 (polyvinyl acetate; ~55% solids) | 40.95 |
| Propylene Glycol | 1.00 |
| Amerstat 251 (preservative) | 0.10 |

Bond Strength = 1726 psi

EXAMPLE 8

The following adhesive example had an initial viscosity (LV/4/60RPM) of 1100 cps at 35° C. This product formed a very good paste after 4 days setting undisturbed, with the entire mixture being smooth and uniform.

| Adhesive Paste | |
|---|---|
| Component | Percent by Weight |
| Water | 15.00 |
| Natrosol 250 HHXR | 0.30 |
| Water | 20.00 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben | 0.05 |
| Glyoxal 40% | 0.15 |
| P-571 (polyvinyl acetate; ~55% solids) | 44.45 |
| Propylene Glycol | 1.00 |
| Amerstat 251 (preservative) | 0.10 |

Bond Strength = 3444 psi

EXAMPLE 9

The following adhesive example exhibited some separation prior to paste formation, but was otherwise acceptable.

| Adhesive Paste | |
|---|---|
| Component | Percent by Weight |
| Water | 35.30 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 44.45 |
| Propylene Glycol | 1.00 |
| Amerstat 251 (preservative) | 0.10 |

Bond Strength = 2260 psi

EXAMPLE 10

The following adhesive example, made to test compatibility, gave a heavy and slimy consistency with excessive air entrapment, and undissolved carboxymethylcellulose particles. The use of carboxymethylcellulose was found to give acceptable paste consistency, if it can be properly incorporated into the adhesive.

| Adhesive Paste | |
|---|---|
| Component | Percent by Weight |
| Water | 35.00 |
| Polyglycol P-1200 (polypropylene glycol) | 0.20 |
| Avedex W-15 (potato starch dextrin) | 16.00 |
| Amaizo 100 (corn starch) | 2.75 |
| CMC 7HX4 (carboxymethylcellulose) | 0.30 |
| Ethyl Paraben (preservative) | 0.05 |
| Glyoxal 40% | 0.15 |
| P-571 (polyvinyl acetate; ~55% solids) | 44.45 |
| Propylene Glycol | 1.00 |
| Amerstat 251 (preservative) | 0.10 |

EXAMPLE 11

The following adhesive example eliminated glyoxal and added glycerine in an attempt to make it wash out readily when laundered. However, this product still did not wash out satisfactorily. The viscosity (LV/4/60RPM) was determined to be 1700 cps at 35° C.

| Adhesive Paste for School Glue Product | |
| --- | --- |
| Component | Percent by Weight |
| Water | 15.00 |
| Nastrol 250 HHXR | 0.30 |
| Water | 20.15 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| P-571 (polyvinyl acetate; ~55% solids) | 42.45 |
| Propylene Glycol | 0.50 |
| Glycerine | 2.50 |
| Amerstat 251 (preservative) | 0.10 |

Bond Strength = xxxx psi

EXAMPLE 12

The following adhesive example was prepared in an attempt to establish a high satisfactory range for the dextrin component. This formulation yielded a firmer paste than that of Example 8, but it was found to be spreadable. The initial viscosity (LV/4/60RPM) was determined to be 1300 cps at 35° C.

| Adhesive Paste to Establish Higher Dextrin Range | |
| --- | --- |
| Component | Percent by Weight |
| Water | 15.00 |
| Nastrol 250 HHXR | 0.30 |
| Water* | 20.00 |
| Polyglycol P-1200 (polypropylene glycol) | 0.20 |
| Avedex W-15 (potato starch dextrin) | 25.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 35.45 |
| Propylene Glycol | 1.00 |
| Amerstat 251 (preservative) | 0.10 |

Bond Strength = 2376 psi
*Indicates order of water addition in this example

EXAMPLE 13

The following adhesive example was prepared in an attempt to establish a low satisfactory range for the dextrin component. This formulation yielded a very soft paste, but it was found to be spreadable. The initial viscosity (LV/4/60RPM) was determined to be 2200 cps at 35° C.

| Adhesive Paste to Establish Lower Dextrin Range | |
| --- | --- |
| Component | Percent by Weight |
| Water | 15.00 |
| Natrosol 250 HHXR | 0.30 |
| Water* | 20.00 |
| Polyglycol P-1200 (polypropylene glycol) | 0.20 |
| Avedex W-15 (potato starch dextrin) | 10.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 50.45 |
| Propylene Glycol | 1.00 |
| Amerstat 251 (preservative) | 0.10 |

Bond Strength = 3126 psi
*Indicates order of water addition in this example

EXAMPLE 14

The following adhesive example was prepared in an attempt to establish a further lower satisfactory range for the dextrin component. This formulation yielded a much softer paste than Example 13. The initial viscosity (LV/4/60RPM) was determined to be 2600 cps at 35° C.

| Adhesive Paste to Establish Lower Dextrin Range | |
| --- | --- |
| Component | Percent by Weight |
| Water | 15.00 |
| Natrosol 250 HHXR | 0.30 |
| Water* | 20.00 |
| Polyglycol P-1200 (polypropylene glycol) | 0.20 |
| Avedex W-15 (potato starch dextrin) | 4.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 56.45 |
| Propylene Glycol | 1.00 |
| Amerstat 251 (preservative) | 0.10 |

Bond Strength = 3431 psi
*Indicates order of water addition in this example

EXAMPLE 15

The following adhesive example was prepared in an attempt to establish a further higher satisfactory range for the dextrin component. This formulation yielded a very firm paste, but it was found to be spreadable. The initial viscosity (LV/4/60RPM) was determined to be 2600 cps at 35° C.

| Adhesive Paste to Establish Further Lower Dextrin Range | |
| --- | --- |
| Component | Percent by Weight |
| Water | 15.00 |
| Natrosol 250 HHXR | 0.30 |
| Water* | 20.00 |
| Polyglycol P-1200 (polypropylene glycol) | 0.20 |
| Avedex W-15 (potato starch dextrin) | 30.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 30.45 |
| Propylene Glycol | 1.00 |
| Amerstat 251 (preservative) | 0.10 |

Bond Strength = 871 psi
*Indicates order of water addition in this example

EXAMPLE 16

The following adhesive example was formulated to wash out when laundered. Only a very small amount of glue remained after washing, making it satisfactory for use as a school glue. The initial viscosity (LV/4/60RPM) was determined to be 1100 cps at 35° C., and formed a very good paste after four days.

| Adhesive Paste for Washable School Glue | |
| --- | --- |
| Component | Percent by Weight |
| Water | 15.00 |
| Natrosol 250 HHXR | 0.30 |
| Water* | 20.15 |
| Polyglycol P-1200 (polypropylene glycol) | 0.20 |
| Avedex W-15 (potato starch dextrin) | 16.00 |
| Amaizo 100 (corn starch) | 2.75 |

-continued

| Adhesive Paste for Washable School Glue | |
|---|---|
| Component | Percent by Weight |
| Ethyl Paraben (preservative) | 0.05 |
| P-571 (polyvinyl acetate; ~55% solids) | 41.95 |
| Propylene Glycol | 0.50 |
| Glycerine | 2.00 |
| Corn Syrup | 1.00 |
| Amerstat 251 (preservative) | 0.10 |

Bond Strength = 2871 psi
*Indicates order of water addition in this example

EXAMPLE 17

The following adhesive example was formulated to incorporate a water-soluble plasticizer into the formula of Example 8.

| Adhesive Paste | |
|---|---|
| Component | Percent by Weight |
| Water | 15.00 |
| Natrosol 250 HHXR | 0.30 |
| Water* | 19.00 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| Glyoxal 40% | 0.15 |
| Corn Syrup (water-soluble plasticizer) | 1.00 |
| P-571 (polyvinyl acetate; ~55% solids) | 44.45 |
| Propylene Glycol | 1.00 |
| Amerstat 251 (preservative) | 0.10 |

Bond Strength = 2370 psi
*Indicates order of water addition in this example

EXAMPLE 18

The following adhesive example was formulated to incorporate a water-soluble plasticizer into the formula with an increase in the polyvinyl acetate by 16%. The initial viscosity (LV/4/60RPM) was determined to be 3300 cps at 35° C., and it formed a very good paste after four days. This is a preferred embodiment of a wood glue.

| Adhesive Paste | |
|---|---|
| Component | Percent by Weight |
| Water | 15.00 |
| Natrosol 250 HHXR | 0.30 |
| Water* | 12.00 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| Glyoxal 40% | 0.15 |
| Corn Syrup | 1.00 |
| P-571 (polyvinyl acetate; ~55% solids) | 51.45 |
| Propylene Glycol | 1.00 |
| Amerstat 251 (preservative) | 0.10 |

Bond Strength = 3516 psi
*Indicates order of water addition in this example

EXAMPLE 19

The following adhesive example was formulated to incorporate a hydroxyethylcellulose-stabilized polyvinyl acetate emulsion. The initial viscosity (LV/4/60RPM) was determined to be 1800 cps at 35° C., and it formed a very good paste after four days. This formulation was also prepared with an additional 2.0% Benzoflex 9-88 (to a total of 102%) with a similar initial and final viscosity but with lower bond strength results.

| Adhesive Paste | |
|---|---|
| Component | Percent by Weight |
| Water | 15.00 |
| Natrosol 250 HHXR | 0.30 |
| Water* | 20.00 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| Glyoxal 40% | 0.15 |
| Fuller PD-0062 | 44.45 |
| Propylene Glycol | 1.00 |
| Amerstat 251 (preservative) | 0.10 |

Bond Strength = 2573 psi
*Indicates order of water addition in this example

EXAMPLE 20

The following adhesive example was formulated to incorporate a hydroxyethylcellulose-stabilized polyvinyl acetate emulsion. The initial viscosity (LV/4/60RPM) was determined to be 2900 cps at 35° C. This formulation was also prepared with an additional 2.5% Benzoflex 9-88 (to a total of 102.5%) with similar initial and final viscosity and slightly lower bond strength results.

| Adhesive Paste | |
|---|---|
| Component | Percent by Weight |
| Water | 15.00 |
| Natrosol 250 HHXR | 0.30 |
| Water* | 12.00 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| Glyoxal 40% | 0.15 |
| Corn Syrup | 1.00 |
| Fuller PD-0082 | 51.45 |
| Propylene Glycol | 1.00 |
| Amerstat 251 (preservative) | 0.10 |

Bond Strength = 2060 psi
*Indicates order of water addition in this example

EXAMPLE 21

The following example was made to establish a lower satisfactory range for dextrin without polyvinyl alcohol. The following example gave a softer paste than that of Example 18 without separation. The viscosity (LV/4/60RPM) was determined to be 1300 cps at 35° C.

| Paste Formulation | |
|---|---|
| Component | Percent by Weight |
| Water | 15.00 |
| Natrosol 250 HHXR | 0.30 |
| Water* | 20.00 |
| Polyglycol P-1200 (polypropylene glycol) | 0.20 |
| Avedex W-15 (potato starch dextrin) | 14.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 46.45 |
| Propylene Glycol | 1.00 |
| Amerstat 251 (preservative) | 0.10 |

Bond Strength = 2431 psi
*Indicates order of water addition in this example

EXAMPLE 22

The following example was made to establish a lower satisfactory range for dextrin. The following adhesive example gave an even softer paste than that of Example 21 without separation after setting for four days. The initial viscosity (LV/4/60RPM) was determined to be 1700 cps at 35° C.

| Adhesive Paste | |
|---|---|
| Component | Percent by Weight |
| Water | 15.00 |
| Natrosol 250 HHXR | 0.30 |
| Water* | 20.00 |
| Polyglycol P-1200 (polypropylene glycol) | 0.20 |
| Avedex W-15 (potato starch dextrin) | 12.00 |
| Amaizo 100 (corn starch) | 2.75 |
| Ethyl Paraben (preservative) | 0.05 |
| Glyoxal 40% | 0.15 |
| P-571 (polyvinyl acetate; ~55% solids) | 48.45 |
| Propylene Glycol | 1.00 |
| Amerstat 251 (preservative) | 0.10 |

Bond Strength = 2847 psi
*Indicates order of water addition in this example

EXAMPLE 23

The following adhesive example is a preferred craft adhesive formulation. The initial viscosity (LV/4/60RPM) was determined to be 1350 cps at 35° C. This formulation yielded a glue that was more flexible and thus was preferred as a craft glue to accommodate a variety of craft substrates, surfaces and articles.

| Craft Adhesive | |
|---|---|
| Component | Percent by Weight |
| Water | 15.00 |
| Natrosol 250 HHXR | 0.30 |
| Water* | 19.00 |
| Polyglycol P-1200 (polypropylene glycol) | 0.20 |
| Avedex W-15 (potato starch dextrin) | 16.00 |
| Amaizo 100 (corn starch) | 2.75 |
| Ethyl Paraben (preservative) | 0.05 |
| Glyoxal 40% | 0.15 |
| Corn Syrup (water-soluble plasticizer) | 1.00 |

-continued

| Craft Adhesive | |
|---|---|
| Component | Percent by Weight |
| P-571 (polyvinyl acetate; ~55% solids) | 44.45 |
| Propylene Glycol | 1.00 |
| Benzoflex 9-88 (water-insoluble plasticizer) | 3.00 |
| Amerstat 251 (preservative) | 0.10 |

Bond Strength = 2431 psi
Total 103%
*Indicates order of water addition in this example The high-strength adhesives of the present invention typically have a fluid consistency that allows them to be prepared using standard mixing and dispensing equipment typically used for low viscosity products, but which set or "paste back" within a workable time frame to a paste-like consistency allowing for ease of application.

The present invention yields a high strength adhesive that is easy to spread as library paste but with greater final bond strength and versatility with respect to the surfaces to be bonded. The strength of the adhesive of the present invention is comparable to standard wood glues.

The adhesive stays where placed without running on vertical surfaces and without self-leveling on horizontal surfaces.

The adhesive may be spread over smooth or rough surfaces.

In extruding dispensers, the adhesive is sufficiently thick to be capable of being withdrawn into the dispenser, to avoid waste.

The adhesive also provides good tack qualities, to allow it to join objects together quickly by hand-pressing, and holds objects together with little or no clamping during drying.

The adhesive may be formulated as a general purpose glue, a wood glue or a washable school glue. The adhesive may be formulated with flexibility for use with fabrics and leather.

The adhesive may be packaged using standard equipment, and dispensed from a wide variety of containers, including tubs, tubes, and adhesive extruders and glue sticks.

In view of the foregoing description, one of ordinary skill may be able to make modifications to the present invention, such as through the substitution of equivalent materials, without departing from the spirit of the invention as reflected in the appended claims which are hereby incorporated herein by reference.

What is claimed is:
1. An adhesive composition comprising:
    (a) water present in an amount of from about 40 percent to about 70 percent by weight;
    (b) polyvinyl acetate present in an amount of about 15 percent to about 35 percent by weight;
    (c) dextrin present in an amount from about 5 percent to about 35 percent by weight; and
    (d) raw starch present in an amount from about 0.001 percent to about 5 percent by weight;
    said adhesive having at least 30% by weight solids, having a paste-like consistency, and having a bond strength greater than about 2000 p.s.i. as measured by ASTM D-905.
2. An adhesive composition according to claim 1 wherein said dextrin is high-viscosity potato dextrin.

3. An adhesive composition according to claim 1 wherein said starch is raw cornstarch.

4. An adhesive composition according to claim 1, additionally comprising at least one water-soluble polymer.

5. An adhesive composition according to claim 4, wherein said at least one water-soluble polymer is selected from the group consisting of hydroxymethylcellulose, hydroxyethylcellulose, carboxymethylcellulose, xanthan gum, and natural gums.

6. An adhesive composition according to claim 1, additionally comprising at least one water-soluble plasticizer.

7. An adhesive composition according to claim 1, additionally comprising at least one water-insoluble plasticizer.

8. An adhesive composition according to claim 1, additionally comprising at least one water resistance agent.

9. An adhesive composition according to claim 8 wherein said at least one water resistance agent is glyoxal.

10. An adhesive composition comprising:
  (a) water present in an amount of from about 50 percent to about 60 percent by weight;
  (b) polyvinyl acetate present in an amount of about 24 percent to about 29 percent by weight;
  (c) dextrin present in an amount from about 10 percent to about 25 percent by weight;
  (d) raw cornstarch present in an amount from about 2 percent to about 4 percent by weight; and
  said adhesive having at least 45% by weight solids, having a paste-like consistency, and having a bond strength greater than about 2000 p.s.i. as measured by ASTM D-905.

11. An adhesive composition according to claim 10 wherein said dextrin is high-viscosity potato dextrin.

12. An adhesive composition according to claim 10, additionally comprising at least one water-soluble polymer.

13. An adhesive composition according claimed 12, wherein said at least one water-soluble polymer is selected from the group consisting of hydroxymethylcellulose and hydroxyethylcellulose.

14. An adhesive composition according to claim 10, additionally comprising hydroxyethylcellulose present in an amount from about 0.05 percent to about 1.5 percent by weight.

15. An adhesive composition according to claim 10, additionally comprising at least one water-soluble plasticizer.

16. An adhesive composition according to claim 10, additionally comprising at least one water-insoluble plasticizer.

17. An adhesive composition according to claim 10, additionally comprising at least one water resistance agent.

18. An adhesive composition according to claim 17 wherein said at least one water resistance agent is glyoxal.

19. An adhesive composition according to claim 10, additionally comprising at least one preservative.

20. An adhesive composition according to claim 19 wherein said at least one preservative comprises p-hydroxybenzoate ethyl ester.

21. An adhesive composition comprising:
  (a) water present in an amount of from about 50 percent to about 60 percent by weight;
  (b) polyvinyl acetate present in an amount of about 24 percent to about 29 percent by weight;
  (c) dextrin present in an amount from about 12 percent to about 20 percent by weight; and
  (d) raw cornstarch present in an amount from about 2 percent to about 4 percent by weight;
  said adhesive having at least 45% by weight solids, having a paste-like consistency, and having a bond strength greater than about 2000 p.s.i. as measured by ASTM D-905.

22. An adhesive composition according to claim 21, additionally comprising hydroxyethylcellulose present in an amount from about 0.1 percent to about 0.5 percent by weight.

23. An adhesive composition according to claim 21, additionally comprising polypropylene glycol present in an amount from about 0.05 percent to about 0.5 percent by weight.

24. An adhesive composition according to claim 21, additionally comprising propyleneglycol present in an amount from about 0.20 percent to about 2 percent by weight.

25. An adhesive composition according to claim 21 wherein said dextrin is high-viscosity potato dextrin.

26. An adhesive composition according to claim 21, additionally comprising at least one water-soluble plasticizer.

27. An adhesive composition according to claim 21, additionally comprising at least one preservative.

28. An adhesive composition according to claim 21 wherein said at least one preservative comprises p-hydroxybenzoate ethyl ester.

29. An adhesive composition according to claim 21, additionally comprising corn syrup.

30. An adhesive composition according to claim 21, additionally comprising glyoxal present in an amount from about 0.05 percent to about 0.2 percent by weight.

31. An adhesive dispenser containing an adhesive composition, comprising:
  (a) a hollow container having an open end adapted to hold a paste adhesive; and
  (b) a plunger;
  said paste adhesive comprising:
    (a) water present in an amount of from about 40 percent to about 70 percent by weight;
    (b) polyvinyl acetate present in an amount of about 15 percent to about 35 percent by weight;
    (c) dextrin present in an amount from about 5 percent to about 35 percent by weight; and
    (d) starch present in an amount from about 0.001 percent to about 5 percent by weight;
  said adhesive having at least 30% by weight solids, having a paste-like consistency, and having a bond strength greater than about 2000 p.s.i. as measured by ASTM D-905.

32. An adhesive dispenser containing an adhesive composition according to claim 30, said open end having an opening edge, said opening edge having serrations.

33. An adhesive dispenser containing an adhesive composition, comprising:
  (c) a hollow container having an open end adapted to hold a paste adhesive; and
  (d) a plunger;
  said paste adhesive comprising:
    (a) water present in an amount of from about 50 percent to about 60 percent by weight;
    (b) polyvinyl acetate present in an amount of about 24 percent to about 29 percent by weight;
    (c) dextrin present in an amount from about 10 percent to about 25 percent by weight;
    (d) raw cornstarch present in an amount from about 2 percent to about 4 percent by weight; and said adhesive having at least 45% by weight solids, having a paste-like consistency, and having a bond strength greater than about 2000 p.s.i. as measured by ASTM D-905.

34. An adhesive dispenser containing an adhesive composition according to claim 32, said open end having an opening edge, said opening edge having serrations.

35. An adhesive dispenser containing an adhesive composition, comprising:

(a) a hollow container having an open end adapted to hold a paste adhesive; and (b) a plunger;

said paste adhesive comprising:

(a) water present in an amount of from about 50 percent to about 60 percent by weight;

(b) polyvinyl acetate present in an amount of about 24 percent to about 29 percent by weight;

(c) dextrin present in an amount from about 12 percent to about 20 percent by weight; and (d) raw cornstarch present in an amount from about 2 percent to about 4 percent by weight;

said adhesive having at least 45% by weight solids, having a paste-like consistency, and having a bond strength greater than about 2000 p.s.i. as measured by ASTM D-905.

* * * * *

UNITED STATES PATENT AND TRADEMARK OFFICE
CERTIFICATE OF CORRECTION

PATENT NO. : 6,268,413 B1
DATED : July 31, 2001
INVENTOR(S) : Peter S. Columbus and Yogeshbhai B. Patel It is certified that error appears in the above-identified patent and that said Letters Patent is hereby corrected as shown below:

Column 3,
Line 18, after "such", please insert -- as --.
Line 24, please delete "would" and replace it with -- wood --.
Line 62, after "preferred", please insert -- that --.

Column 4,
Line 5, after "weight", please delete ";" and replace it with -- . --.

Column 5,
Line 45, please delete "a".

Column 7,
Line 42, please delete "Examples" and replace it with -- Example --.

Column 8,
Line 8, after "Water", please insert -- * --.
Line 17, please insert -- *Indicates order of water addition in this example --.

Column 9,
Line 7, please delete "Nastrol" and replace it with -- Natrosol --.
Line 8, after "Water", please insert -- * --.
Line 16, please delete "Bond Strength = xxxx psi".
Line 17, please insert -- *Indicates order of water addition in this example --.
Line 30, please delete "Nastrol" and replace it with -- Natrosol --.

Column 10,
Line 6, after "Establish", please insert -- Further --.

Column 14,
Line 21, after "is", please insert -- as --.

UNITED STATES PATENT AND TRADEMARK OFFICE
CERTIFICATE OF CORRECTION

PATENT NO. : 6,268,413 B1
DATED : July 31, 2001
INVENTOR(S) : Peter S. Columbus and Yogeshbhai B. Patel It is certified that error appears in the above-identified patent and that said Letters Patent is hereby corrected as shown below:

Column 15,
Line 35, please delete "claimed" and replace it with -- to claim --.

Signed and Sealed this

Eleventh Day of December, 2001

Attest:

NICHOLAS P. GODICI
Attesting Officer
Acting Director of the United States Patent and Trademark Office